United States Patent Office 2,931,222
Patented Apr. 5, 1960

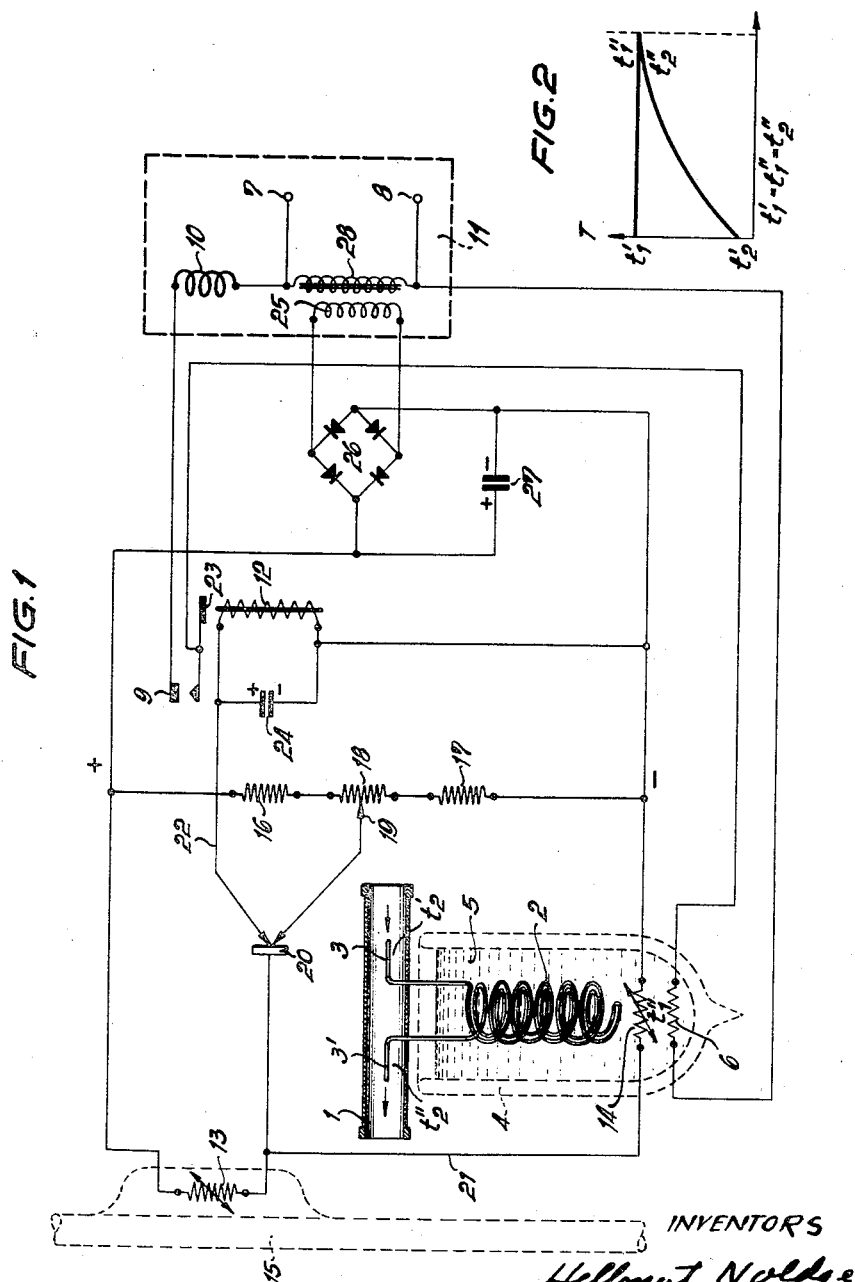

2,931,222

METHOD AND DEVICE FOR MEASURING QUANTITIES OF HEAT

Hellmut Nöldge, Christian Gröber, and Ernst Tödten, Hamburg, Germany

Application January 4, 1957, Serial No. 632,523

Claims priority, application Germany January 4, 1956

18 Claims. (Cl. 73—193)

The present invention relates to a method and a device for measuring the quantity of heat discharged from a fluid.

The conventionally manufactured heat quantity measuring devices known up to now and the measuring methods, which are employed with these measuring devices, in most cases are not satisfactory because of their measuring errors or because of their high cost of manufacture. The lack of accuracy of measurement inherent in most of the known devices first of all is caused by the fact that in these known devices the difference of temperature with the quantity of flow is generally only multiplied, and there is no exact calorimetric measurement performed.

It is thus an object of the invention to provide an inexpensive, exact, heat measuring device which may be easily calibrated and which may be used for measuring the heat consumption of dwelling houses.

For measuring the amount of heat delivered by a fluid it is proposed to split off from the total fluid flow, after this total fluid flow has given off the amount of heat to be measured, a partial flow proportional to the total flow and continuously heat this partial flow up to the inlet temperature, wherein the supplied amount of heat required for reheating the partial flow is calorimetrically measured as a value proportional to the total amount of heat being discharged. Preferably the reheating of the deviated partial flow is performed by means of a heat exchanger which is inserted into a calorimeter, the liquid filling of which is controlled so as to maintain the inlet temperature by an amount of heat which may be measured. When electric heating is used the necessary electric energy may be measured by means of a common watt hour meter.

In the calorimeter according to the invention a heat exchanger is arranged within a calorimeter vessel through which passes a partial flow of the heat-carrying fluid after this fluid has discharged the heat, the liquid filling of said calorimeter vessel, especially oil having good heat-exchanging qualities, being maintained at the inlet temperature by means of a temperature-controlled electric heating resistance, wherein a watt consumption indicating instrument is provided to indicate the electric heat discharged from the heating circuit. Preferably a bridge circuit is arranged for controlling the heating of the calorimeter having in two of the bridge branches a temperature-dependent resistance representing the inlet temperature and a temperature-dependent resistance representing the temperature of the calorimeter fluid and having a relay within the zero branch causing the switching on of the heating resistance in the case of unbalance of the bridge. For improving the response of the measuring device the relay may be provided with amplifying means, such as a transistor circuit.

According to a preferred embodiment of the invention the measuring device is operated with A.C.-voltage, wherein the amount of heat to be measured may be indicated by an A.C.-watt hour meter. In such an embodiment, in which the current winding of the watt hour meter is connected in series with the heating resistance, it is possible to design the appertaining voltage winding in a most favorable way as the primary winding of a transformer which by means of a dry rectifier provides the D.C.-voltage for supplying the bridge.

Further details and features of the present invention are to be seen from the following specification and the accompanying drawing, in which a preferred embodiment of the invention is illustrated.

Fig. 1 shows an electric basic circuit diagram of a calorimeter device according to the invention, and Fig. 2 is a graph which reflects the course of the temperature of the re-heated partial current of the fluid.

The calorimeter counter according to the invention makes use of the principle of the electric heat equivalent which may be exactly detected in the measuring technique, and the counter measures the heat consumption of a heating system by measuring an exactly defined partial flow of the total flow of the heating system to be supervised. The calorimeter counter to be described in the following specification substantially comprises a measuring path, a heat exchanger calorimeter, a thermometric control means, and an A.C.-watt hour meter.

The measuring path 1 may be adapted in regard to its cross-section to the dimensions of the return pipe of the heating system and is inserted therein as a by-path. The heat exchanger 2 connected in parallel to the measuring path and its inlet port 3 and outlet port 3' are arranged such that a proportional amount of fluid is obtained from the middle of the main flow. With such an arrangement the quantities of flow correspond to their flow resistances according to the Hagen-Poiseuille-law distributed exactly proportional to the fourth power of their radii. This prementioned distribution ratio is valid for any quantities of flow provided that a laminar flow is present. For compensating for manufacturing tolerances it is possible to exactly determine the distribution ratio by gauging before putting the measuring device into operation.

The heat exchanger 2 by-passing the measuring path preferably consists of a thin-walled copper tube which is wound up to a dual stranded spiral for suppressing thermal agitations. This heat exchanger 2 is inserted into a heat exchanger calorimeter which consists of an isolated vessel 4 having a liquid filling 5. The vessel preferably is a Dewar vessel. The oil bath 5 forming the liquid filling is maintained at a temperature corresponding to the inlet temperature of the fluid to be measured by an electric heating resistance 6 as will be explained. The electric current for the whole measuring system is supplied from a common A.C.-source connected to the terminals 7 and 8. One of the terminals of the heating resistance 6 is directly connected with the terminal 8, while the other terminal of the heating resistance via the relay contact 9 and the current winding 10 of an A.C.-watt hour meter 11 is connected with the other terminal 7 of the A.C.-source. The contact arrangement 9 is actuated by the relay winding 12, so that the heating resistance 6 receives the full voltage of the A.C.-source, when the relay is excited. Since the heating current in the heating resistance 6 also passes through the current winding 10, the watt hour meter 11 may furnish an exact wattmetric indication of the electric energy supplied to the calorimeter and therefore of the electric heat supplied to the measuring path 1, 3.

The heating resistance is designed such that it may compensate the loss of energy, which the heat exchanger 2 provokes within the calorimeter, even in case of greatest possible heat energy differences. Preferably the heating resistance 6 is designed compactly so that it only occupies a small space within the oil bath 5 and so that due to the arising thermal current between the heating wire and the oil a good turbulence is produced and therefore a quick equalizing of the temperature within the calorimeter bath is achieved.

To make sure that the temperature within the calorimeter and also the temperature of the fluid leaving the system via the line 3' is exactly maintained on the inlet temperature, a thermometric control circuit is provided which by means of a bridge connection on the one hand picks up the temperature at the inlet and on the other hand the temperature within the calorimeter oil bath. The control circuit shown in Fig. 1 uses a D.C.-bridge, in which two temperature-dependent resistances 13 and 14 are compared with one another. The resistance 13 is—as indicated with dashed lines—arranged within an extension of the inlet pipe 15, so that its ohmic resistance becomes a function of the inlet temperature. Preferably the resistance 13 is embedded in paraffin and enclosed in an envelope of rubber, Perbunan, polyvinylchloride, or the like. The resistance, however, may also be inserted with a plunger sleeve directly into the inlet pipe. The paraffin filling which under the influence of the heat becomes liquid, here serves simultaneously as an electric insulation and as a heat exchange medium.

In the same way as the resistance 13 the bridge resistance 14 changes its resistance value in dependence from the temperature, and because this latter resistance is arranged within the calorimeter, it changes its value in dependence from the temperature of the oil filling 5.

Both the resistances 13 and 14 are so designed that for equal temperatures at the inlet and within the calorimeter vessel the bridge connection is balanced and there is no current flow in the zero branch. If, however, there occurs an unbalance of the bridge by a diminished temperature within the calorimeter vessel, provision is made, that the current flowing through the zero branch of the bridge actuates the relay 12 and switches on the heating resistance 6.

The temperature dependent resistances 13 and 14 are preferably negative temperature coefficient resistances, because the temperature coefficient of such resistances is about ten times greater than that of the normal temperature-dependent resistances, and because a linear relation between temperature and resistance is not necessary for this measuring device which is practically an on-off control. Further it is possible by choosing negative temperature coefficient resistances having a small heat capacity to obtain a inertialess control.

The prementioned bridge connection is completed by two fixed resistances 16 and 17 and a potentiometer 18, the tap 19 of which is provided for gauging and calibrating purposes and forms together with the connection point between the two resistances 13 and 14 the terminals of the bridge zero branch.

For attaining a greater switching efficiency the zero branch comprises a transistor, the base of which is connected with the connection point of the two resistances 13 and 14 and the emitter with the potentiometer tap 19. As it is shown the switching power may be tapped off from one of the feeding points of the bridge and the collector of the transistor and may directly be fed into the relay coil 12. For instance it is possible with a transistor as it is manufactured by the firm Valvo under the type designation OC 72 and OC 76, to have a hundredfold power amplification when there is present a bridge voltage of about 30 volts. In a test circuit the inventors could measure a collector current of about 2 milliamperes, which increased to about 3 milliamperes, when the relay was switched on. The working point of the transistor may be adjusted by a suitable dimensioning of the bridge resistances 16, 17, and 18, which in the test circuit of the applicants were 200, 300, 200 ohms respectively. For each response of the relay 12 its armature 23 is attracted and the heating circuit of the heating resistance 6 completed and branched to the source of voltage, as already described. The susceptibility of the prementioned control device was found in extended tests to be ±0.2° C.

The capacitor 24 shunting the relay coil 12 serves to delay somewhat the de-energizing of the relay.

The bridge connection is fed from the terminals 7 and 8 of the connected A.C.-source via a transformer, and a two-way dry rectifier 26 which is supplied by the secondary winding 25 of the transformer. The capacitor 27 shunting the feeding points of the bridge serves for further smoothing the voltage. To eliminate the need for a separate feeding transformer for the bridge connection the voltage winding 28 of the A.C.-watt hour meter 11 may serve as a primary winding for inducing in the secondary winding 25 the necessary feeding voltage, as shown in Fig. 1.

Since the heat consumption within the calorimeter induced by the partial flow of the returning fluid of the heating system—physically considered—is directly proportional to the metered electric energy, the watt hour meter under consideration of the electric heat equivalent and the ratio of 1000:865 may directly be calibrated in kilogram-calories. Since in the chosen measuring arrangement the watt hour meter may always operate in its normal load range (e.g. between 0.1 and 1.0 ampere), it is especially advantageous to simplify the design of the watt hour meter, since it is not necessary to provide special correcting means for small load and phase shift. Furthermore, also the requirements for starting the watt hour meter and influences due to overvoltages are insignificant. In such special meters it is possible to enclose the additional circuit elements, as for instance all the bridge circuit and the voltage supply means thereof, so that it is only necessary to arrange the calorimeter with the measuring path and the inlet temperature sensing means outside the watt hour meter.

The graph shown in Fig. 2 elucidates the course of temperature within the calorimeter 4, 5. It signifies:

$t_1'$=inlet temperature within the pipe 15
$t_1''$=temperature of the oil bath 5 being maintained on the inlet temperature
$t_2'$=return flow temperature within the pipe 1 prior to the heat exchange
$t_2''$=return flow temperature within the pipe 3 after the heat exchange From the prementioned disclosure it is obvious that the invention shows a physically correct and therefore calibratable way for detecting and counting the heat consumption. The present invention makes it possible to provide a calorimeter which is considerably less expensive to manufacture than known measuring devices of this kind. Therefore the calorimeter according to the invention is suitable for detecting the heat consumption in central heated dwellings as well as remote heating systems.

The inventive concept described in connection with the forgoing special embodiment may be modified to a wide extent. For instance all the current supply for the measuring device may be furnished from a D.C.-current source or from a battery, and furthermore there exist many possibilities for controlling the temperature within the calorimeter vessel, for instance thermocouples and valve amplifiers may be used for the same purpose.

What we claim is:

1. Method for measuring the amount of heat discharged by a heat-carrying fluid comprising the following steps: deviating a partial current from the total current of the heat-carrying fluid after said heat-carrying fluid has discharged the amount of heat to be measured, reheating said partial current to the inlet temperature present in the heat-carrying fluid before discharging the amount of heat to be measured, and measuring calorimetrically the amount of heat supplied to said partial current during said re-heating step as a value proportional to the amount of heat being altogether discharged.

2. Method for measuring the amount of heat discharged by a heat-carrying fluid comprising the following steps: deviating a partial current from the total current of the heat-carrying fluid after said heat-carrying fluid has discharged the amount of heat to be measured, re-heating said deviated partial current to the inlet temperature present in the heat-carrying fluid before discharging the amount of heat to be measured, supplying heat to the liquid filling of a calorimeter vessel in which said reheating takes place so as to maintain within said liquid filling a temperature equal to the temperature of the heat-carrying fluid before discharging the amount of heat to be measured and measuring the amount of heat supplied to said liquid filling of the calorimeter vessel as a value proportional to the amount of heat being altogether discharged.

3. Method for measuring the amount of heat discharged by a heat-carrying fluid comprising the following steps: deviating a partial current from the total current of the heat-carrying fluid after said heat-carrying fluid has discharged the amount of heat to be measured, electrically re-heating said deviated partial current to the inlet temperature present in the heat-carrying fluid before discharging the amount of heat to be measured, and measuring the electric energy supplied for re-heating said partial current during the re-heating step as a value proportional to the amount of heat being altogether discharged.

4. Method for measuring the amount of heat discharged by a heat-carrying fluid comprising the following steps: deviating a partial current from the total current of the heat-carrying fluid after said heat-carrying fluid has discharged the amount of heat to be measured, re-heating said deviated partial current to the inlet temperature present in the heat-carrying fluid before discharging the amount of heat to be measured, electrically supplying heat to the liquid filling of a calorimeter vessel in which said reheating takes place so as to maintain within said liquid filling a temperature equal to the temperature of the heat-carrying fluid before discharging the amount of heat to be measured, and measuring the electric energy supplied during the re-heating step as a value proportional to the amount of heat being altogether discharged.

5. Method for measuring the amount of heat discharged by a heat-carrying fluid comprising the following steps: deviating a partial current from the total current of the heat-carrying fluid after said heat-carrying fluid has discharged the amount of heat to be measured, electrically re-heating said deviated partial current in dependence from the difference between the temperature present in said partial current and the inlet temperature present in the heat-carrying fluid before discharging the amount of heat to be measured so as to re-establish within said partial current said inlet temperature, and measuring the electric energy supplied for re-heating said partial current during the re-heating step as a value proportional to the amount of heat being altogether discharged.

6. Apparatus for measuring the amount of heat discharged by a heat-carrying fluid comprising conduit means for by-passing a partial current of the heat-carrying liquid which has discharged the amount of heat to be measured, heat-exchanger means arranged within said conduit means, a liquid filled calorimeter vessel, said heat exchanger means being submerged in the liquid filling of said calorimeter vessel, an electric heating resistance arranged within said liquid filling, thermometric control means for supplying said electric heating resistance with electric energy so as to maintain said liquid filling at the temperature present in said heat-carrying fluid before this fluid has discharged the amount of heat to be measured, and wattmetric counter means for measuring the electric energy supplied to said electric heating resistance.

7. Apparatus for measuring the amount of heat discharged by a heat-carrying fluid comprising conduit means for by-passing a partial current of the heat-carrying liquid which has discharged the amount of heat to be measured, a thin-walled copper pipe spiral arranged within said conduit means, a liquid filled calorimeter vessel, said pipe spiral being submerged in the liquid filling of said calorimeter vessel, an electric heating resistance arranged within said liquid filling, thermometric control means for supplying said electric heating resistance with electric energy so as to maintain said liquid filling at the temperature present in said heat-carrying fluid before this fluid had discharged the amount of heat to be measured, and wattmetric counter means for measuring the electric energy supplied to said electric heating resistance.

8. The invention as claimed in claim 7, said pipe spiral being bifilarly wound.

9. Apparatus for measuring the amount of heat discharged by a heat-carrying fluid comprising conduit means for by-passing a partial current of the heat-carrying liquid which has discharged the amount of heat to be measured, heat-exchanger means arranged within said conduit means, a liquid filled calorimeter vessel, said heat-exchanger means being submerged in the liquid filling of said calorimeter vessel, an electric heating resistance arranged within said liquid filling, bridge circuit means for thermometrically controlling the supply of electric energy to said electric heating resistance so as to maintain said liquid filling at the temperature present in said heat carrying fluid before this fluid had discharged the amount of heat to be measured, said bridge circuit containing in one of its bridge branches an electric circuit element reflecting the temperature of the heat-carrying fluid before this fluid had discharged the amount of heat to be measured, in another of its bridge branches an electric circuit element reflecting the temperature of the liquid filling of said calorimeter vessel, and in its zero bridge branch an electric switching means for supplying in case of bridge unbalance electric energy to said electric heating resistance, and wattmetric counter means for measuring the electric energy supplied to said electric heating resistance.

10. The invention as claimed in claim 9 wherein said temperature reflecting circuit elements are temperature dependent resistors submerged in the heat-carrying fluid prior to the discharge of the amount of heat to be measured and in the liquid filling of said calorimeter.

11. Apparatus for measuring the amount of heat discharged by a heat-carrying fluid comprising conduit means for by-passing a partial current of the heat-carrying liquid which has discharged the amount of heat to be measured, heat-exchanger means arranged within said conduit means, a liquid filled calorimeter vessel, said heat-exchanger means being submerged in the liquid filling of said calorimeter vessel, an electric heating resistance arranged within said liquid filling, bridge circuit means for thermometrically controlling the supply of electric energy to said electric heating resistance so as to maintain said liquid filling at the temperature present in said heat carrying fluid before this fluid had discharged the amount of heat to be measured, one bridge branch of said bridge circuit means containing an electric circuit element reflecting the temperature of the heat-carrying fluid prior to the discharge of the amount of heat to be measured, another bridge branch of said bridge circuit means containing an electric circuit element reflecting the temperature of the liquid filling of said calorimeter vessel, relay means for energizing said heating resistance in case of bridge unbalance, a transistor amplifier means for energizing said relay means, said relay means being connected with one of its terminals to one of the feeding terminals of the bridge circuit means and with the other of its terminals to the collector of said transistor, the base and the emitter of said transistor being connected with the two zero-terminals of said bridge circuit means, and wattmetric counter means for measuring the electric energy supplied to said electric heating resistance.

12. The invention as claimed in claim 11 wherein said relay means is of the time delay type.

13. The invention as claimed in claim 11 wherein one of the zero terminals of the bridge circuit means is an adjustable tap of an additional calibrating resistor connecting the circuit elements of two adjacent bridge branches.

14. The invention as claimed in claim 11 wherein the wattmetric counter means is a watt hour meter.

15. Apparatus for measuring the amount of heat discharged by a heat-carrying fluid comprising conduit means for by-passing a partial current of the heat-carrying liquid which has discharged the amount of heat to be measured, heat-exchanger means arranged within said conduit means, a liquid filled calorimeter vessel, said heat-exchanger means being submerged in the liquid filling of said calorimeter vessel, an electric heating resistance arranged within said liquid filling, bridge circuit means for thermometrically controlling the supply of electric A.C.-energy to said electric heating resistance so as to maintain said liquid filling at the temperature present in said heat carrying fluid before this fluid had discharged the amount of heat to be measured, said bridge circuit containing in one of its bridge branches an electric circuit element reflecting the temperature of the heat-carrying fluid before this fluid had discharged the amount of heat to be measured, in another of its bridge branches an electric circuit element reflecting the temperature of the liquid filling of said calorimeter vessel, and in its zero bridge branch an electric switching means for supplying in case of bridge unbalance electric A.C.-energy to said electric heating resistance, and an A.C.-watt hour meter having its current winding arranged within the electric supply circuit of said heating resistance.

16. Apparatus for measuring the amount of heat discharged by a heat-carrying fluid comprising conduit means for by-passing a partial current of the heat-carrying liquid which has discharged the amount of heat to be measured, heat-exchanger means arranged within said conduit means, a liquid filled calorimeter vessel, said heat-exchanger means being submerged in the liquid filling of said calorimeter vessel, an electric heating resistance arranged within said liquid filling, bridge circuit means for thermometrically controlling the supply of electric A.C.-energy to said electric heating resistance so as to maintain said liquid filling at the temperature present in said heat carrying fluid before this fluid had discharged the amount of heat to be measured, said bridge circuit containing in one of its bridge branches an electric circuit element reflecting the temperature of the heat-carrying fluid before this fluid had discharged the amount of heat to be measured, in another of its bridge branches an electric circuit element reflecting the temperature of the liquid filling of said calorimeter vessel, and in its zero bridge branch an electric switching means for supplying in case of bridge unbalance electric A.C.-energy to said electric heating resistance, and an A.C.-watt hour meter having its current winding arranged within the electric supply circuit of said heating resistance, the voltage winding of said A.C.-watt hour meter forming the primary winding of a supply transformer, lead means connecting the secondary winding of said transformer to a rectifier means supplying D.C.-voltage to the voltage terminals of said bridge circuit means.

17. The invention as claimed in claim 16 wherein said rectifier means are full-wave dry rectifiers.

18. The invention as claimed in claim 6 wherein said electric heating resistance is condensed to occupy a small space only so as to provide a turbulence in the liquid filling of said calorimeter vessel.

References Cited in the file of this patent

UNITED STATES PATENTS

| 2,329,813 | Amsler | Sept. 21, 1943 |
| 2,398,606 | Wang | Apr. 16, 1946 |
| 2,685,203 | McEvoy et al. | Aug. 3, 1954 |

FOREIGN PATENTS

| 701,339 | Great Britain | Dec. 23, 1953 |